(12) United States Patent
Agarwal et al.

(10) Patent No.: US 8,049,431 B2
(45) Date of Patent: Nov. 1, 2011

(54) APPARATUS AND METHOD FOR DRIVING A LIGHT SOURCE, AND DISPLAY APPARATUS USING THE SAME

(75) Inventors: Pankaj Agarwal, Suwon-si (KR); Joon-hyun Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 816 days.

(21) Appl. No.: 11/853,344

(22) Filed: Sep. 11, 2007

(65) Prior Publication Data
US 2008/0224628 A1    Sep. 18, 2008

(30) Foreign Application Priority Data
Mar. 13, 2007   (KR) .................. 10-2007-0024452

(51) Int. Cl.
*H05B 41/16* (2006.01)
*H05B 39/00* (2006.01)

(52) U.S. Cl. ................................. 315/246; 315/200 R
(58) Field of Classification Search .................. 315/291, 315/307, 200 R, 209 R, 246, DIG. 7
See application file for complete search history.

(56) References Cited

U.S. PATENT DOCUMENTS

| | | | |
|---|---|---|---|
| 5,635,826 A * | 6/1997 | Sugawara | 323/300 |
| 6,396,722 B2 * | 5/2002 | Lin | 363/98 |
| 6,548,966 B2 * | 4/2003 | Kawasaka et al. | 315/291 |
| 7,327,100 B2 * | 2/2008 | Matsuura | 315/307 |
| 7,355,351 B2 * | 4/2008 | Kyrberg et al. | 315/209 R |

\* cited by examiner

Primary Examiner — Douglas W Owens
Assistant Examiner — Minh D A
(74) Attorney, Agent, or Firm — Sughrue Mion, PLLC

(57) ABSTRACT

An apparatus and a method for driving a light source are provided. The apparatus includes a power converting unit which converts a direct current (DC) power into an alternating current (AC) power for driving the light source, and a control unit which controls the power converting unit to convert the DC power into the AC power according to a pulsewave.

42 Claims, 11 Drawing Sheets

MODE 1

MODE 2

MODE 3

MODE 4

MODE 5

MODE 6

MODE 7

APPARATUS AND METHOD FOR DRIVING A LIGHT SOURCE, AND DISPLAY APPARATUS USING THE SAME

CROSS-REFERENCE TO RELATED APPLICATION

This application claims priority from Korean Patent Application No. 2007-0024452, filed Mar. 13, 2007 in the Korean Intellectual Property Office, the entire disclosure of which is hereby incorporated by reference.

BACKGROUND OF THE INVENTION

1. Field of the Invention

Apparatuses and methods consistent with the present invention relate to driving a light source, and more particularly, to an apparatus and a method for driving light sources of alternating current (AC) pulse waveforms of different specifications, and a display apparatus using the same.

2. Description of the Related Art

A liquid crystal display (LCD) is a flat-panel display that uses liquid crystal. LCDs are used in many industries due to their advantages such as relatively thinner products, and lower requirements for power consumption and driving voltage.

Because liquid crystal used in a display panel is non-radiant element, the LCD requires a separate light source to emit a light of a predetermined brightness.

A cold cathode fluorescent lamp (CCFL) having a straight glass tube form, has been widely used as a light source. CCFL light sources are mainly classified into an edge light type and a direct light type, according to locations where the light sources are placed.

An edge type light source uses a transparent light guide panel, in which the light source is placed beside the light guide panel such that the light from the light source is multi-reflected against one side of the light guide panel and falls onto the LCD panel. The direct type light source uses a plurality of light sources disposed immediately below the LCD panel, with a diffusing plate provided on the front side of the light source and a reflective plane provided on the rear side of the light source, such that the light from the light source is reflected and diffused before falling onto the LCD panel.

However, the LCD usually has a considerable amount of light loss due to the presence of optical elements such as light guide plate, diffusing plate, or the like, and also has shortcomings of high manufacture cost due to complex structure, and degradation of brightness uniformity.

A surface light source device has recently been developed as a solution to the problems mentioned above. The surface light source device includes a light source having a radiation area, and electrodes to supply radiation voltage to the light source. The surface light source device generates plasma radiation in the radiation area, using the supplied radiation voltage, and emits a ray of light.

The surface light source device includes a radiation gas which is filled in the radiation area, and a first and second electrodes for receiving radiation voltage to form a radiation area and generate plasma radiation. Because the surface light source device requires a predetermined level of capacitance, alternating current (AC) power such as sine wave, is required as radiating voltage.

Examples of a method or a circuit to provide AC power to the surface light source device have been disclosed in U.S. Patent Application Publication No. 2007/0018590, Korean Patent No. 10-0467875, and Japanese Patent No. 2006-338897.

Factors that determine driving efficiency of the surface light source device include pulse form and pulsewidth of the AC power which is separated during a pause. The general duty ratio of the pulse ranges from 1:5 to 1:10.

However, most of the previously suggested techniques considered only one factor to determine the driving efficiency, in which either the monopole pulse separated during a pause is provided, without considering the time required for the charging or discharging of the capacitor, or bipolar pulse is provided without considering the pause.

Accordingly, when the related art apparatuses or methods as the ones disclosed in the abovementioned publications are applied, lifespan of the light source is shortened due to use of monopole pulse and subsequent generation of bias stress. Furthermore, on a designing part, it is hard to ensure a sufficient length of pause to achieve the desired light source driving efficiency.

Furthermore, due to a requirement of a boost converter to provide light source driving efficiency, and sufficient level of AC power, product size and manufacture cost increase.

Furthermore, because AC power of a fixed pulsewidth or a fixed length of pause is supplied to the light source, an apparatus or a method is required, which is capable of providing a customized pulsewidth and length of pause according to the types of radiating gases, and thus achieving maximum light source driving efficiency.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and a method for driving a light source, which is easily applicable to light sources of different specified AC pulse waveforms, and capable of improving light source driving efficiency, and which provides compact and low-price products, and a display apparatus using the same.

According to an aspect of the present invention, there is provided an apparatus for driving a light source, including a power converting unit for converting an externally supplied direct current (DC) power into an AC power for driving the light source, and a control unit for controlling the power converting unit to convert the DC power into the AC power according to a predetermined pulsewave which causes the light source to drive with an optimum efficiency.

The control unit controls at least one of a phase, a pulsewidth, and a length of pause time of the AC power, so that the AC power is converted according to the predetermined pulsewave.

The apparatus may further include a power supply unit for providing the DC power.

The power converting unit includes a first power converter for converting the DC power into a first AC power, and a second power converter for converting the DC power into a second AC power, and the control unit controls such that the DC power is converted into the first and second AC powers sequentially, and that the first and second AC powers are input to the light source sequentially, having the length of pause time according to the predetermined pulsewave and a phase reverse to each other.

The control unit is provided to the light source to control such that one of electrodes receiving the first and second AC powers receives an electric potential higher than the other in an alternating order, and that the first and second powers are converted sequentially.

The control unit causes the electric potential of the one electrode to be formed according to the first and second powers, and causes the electric potential of the other electrode to be formed according to a ground power.

The first and second power converters each comprise a resonant circuit including at least one inductor element and a capacitor element.

The capacitor element includes electrodes of the light sources, and a dielectric material arranged between the electrodes.

The control unit includes a switching unit for causing a resonant circuit of the first power converter and a resonant circuit of the second power converter to resonate sequentially, and a switching controller for providing a switching signal to control switching of the switching unit.

The apparatus may further include for boosting the first and second AC powers provided to the light source.

The power converting unit includes a resonant circuit including at least one inductor element and a capacitor element.

The capacitor element includes electrodes of the light sources, and a dielectric material arranged between the electrodes.

The control unit includes a first switching unit for selectively providing electric current to the light source by switching, a second switching unit for causing the DC power to be converted into the AC power by the resonant circuit based on the operation of the first switching unit, and for controlling a charging potential of the capacitor element such that the AC power has a pulsewidth of a potential according to the predetermined pulsewave, and a switching controller for providing a switching signal to control the switching of the first and second switching units.

The control unit controls through the switching of the first and second switching units such that the AC power has a length of pause time according to the predetermined pulsewidth.

According to another aspect of the present invention, there is provided an apparatus for driving a light source, including a first electrode, a second electrode, a dielectric material interposed between the first and second electrodes such that the light source is driven by AC powers supplied to the first and second electrodes, a power supply unit for outputting a DC power, a first inductor unit formed between the power supply unit and the first electrode, a second inductor unit formed between the power supply unit and the second electrode, a first switching unit connected with a first node between the first inductor unit and the first electrode, a second switching unit connected with a second node between the second inductor unit and the second electrode, and a controller for controlling such that the DC power is converted into a first and second AC powers sequentially, according to the first inductor unit and the light source, and according to the second inductor unit and the light source, and that the first and second AC powers are input to the light source sequentially according to a predetermined pulsewave to cause the light source to drive with an optimum efficiency.

The controller controls such that the first and second AC powers are input to the light source sequentially, having the length of pause time according to the predetermined pulsewave and a phase reverse to each other.

If the first switching unit is turned off, the first inductor unit and the light source are resonated and convert the DC power into the first AC power.

If the second switching unit is turned off, the second inductor unit and the light source are resonated and convert the DC power into the second AC power.

The controller controls such that one of the electrodes receives an electric potential higher than the other in an alternating order, and that the first and second powers are converted sequentially.

The controller causes the electric potential of the one electrode to be formed according to the first and second powers, and causes the electric potential of the other electrode to be formed according to a ground power.

The apparatus may further include a booster circuit which includes a primary coil connected between the first and second nodes, and a secondary coil facing the primary coil and connected with both ends of the first and second electrodes.

According to another aspect of the present invention, there is also provided an apparatus for driving a light source, including a first electrode, a second electrode, a dielectric material interposed between the first and second electrodes such that the light source is driven by AC powers supplied to the first and second electrodes, a power supply unit for outputting a DC power, an inductor unit formed between the power supply unit and the first electrode, a first switching unit connected in parallel with the light source at a node between the inductor unit and the first electrode, a second switching unit connected in series with the light source at the node, and a controller for controlling such that the DC power is converted into the AC powers sequentially according to the inductor unit and the light source, and that the AC powers are input to the light source sequentially according to a predetermined pulsewave to cause the light source to drive with an optimum efficiency.

The controller provides a switching signal for controlling switching operation of the switching units such that the AC powers have a pulsewidth of a potential and a length of pause time according to the predetermined pulsewave.

According to another aspect of the present invention, there is also provided a method for driving a light source, including converting an externally supplied DC power into an AC power for driving the light source, and controlling the power converting unit to convert the DC power into the AC power according to a predetermined pulsewave which causes the light source to drive with an optimum efficiency.

The controlling controls at least one of a phase, a pulsewidth, and a length of pause time of the AC power, so that the AC power is converted according to the predetermined pulsewave.

The converting includes converting the DC power into a first AC power, and converting the DC power into a second AC power.

The controlling controls such that the DC power is converted into the first and second AC powers sequentially, and that the first and second AC powers are input to the light source sequentially, having the length of pause time according to the predetermined pulsewave and a phase reverse to each other.

The method may further include boosting the first and second AC powers provided to the light source.

The controlling controls such that the AC power has a length of pause time according to the predetermined pulsewidth.

According to another aspect of the present invention, there is also provided a display apparatus, including a light source unit including a first electrode, a second electrode, and a dielectric material interposed between the first and second electrodes, a light source driving unit for inputting an AC power to the light source unit, and a display panel for displaying an image using a ray of light emitted from the light source being driven by the light source driving unit, wherein the light source driving unit includes a power converting unit for converting an externally supplied DC power into an alternating current (AC) power for driving the light source, and a control unit for controlling the power converting unit to convert the DC power into the AC power according to a predetermined pulsewave which causes the light source to drive with an optimum efficiency.

The dielectric material is formed of a radiating gas, and the light source unit includes a surface light source device for emitting the light, using plasma radiation of the AC powers being input to the first and second electrodes.

The control unit controls at least one of a phase, a pulsewidth, and a length of pause time of the AC power, so that the AC power is converted according to the predetermined pulsewave.

BRIEF DESCRIPTION OF THE DRAWINGS

The above and other aspects of the present invention will be more apparent from the following detailed description of exemplary embodiments with reference to the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
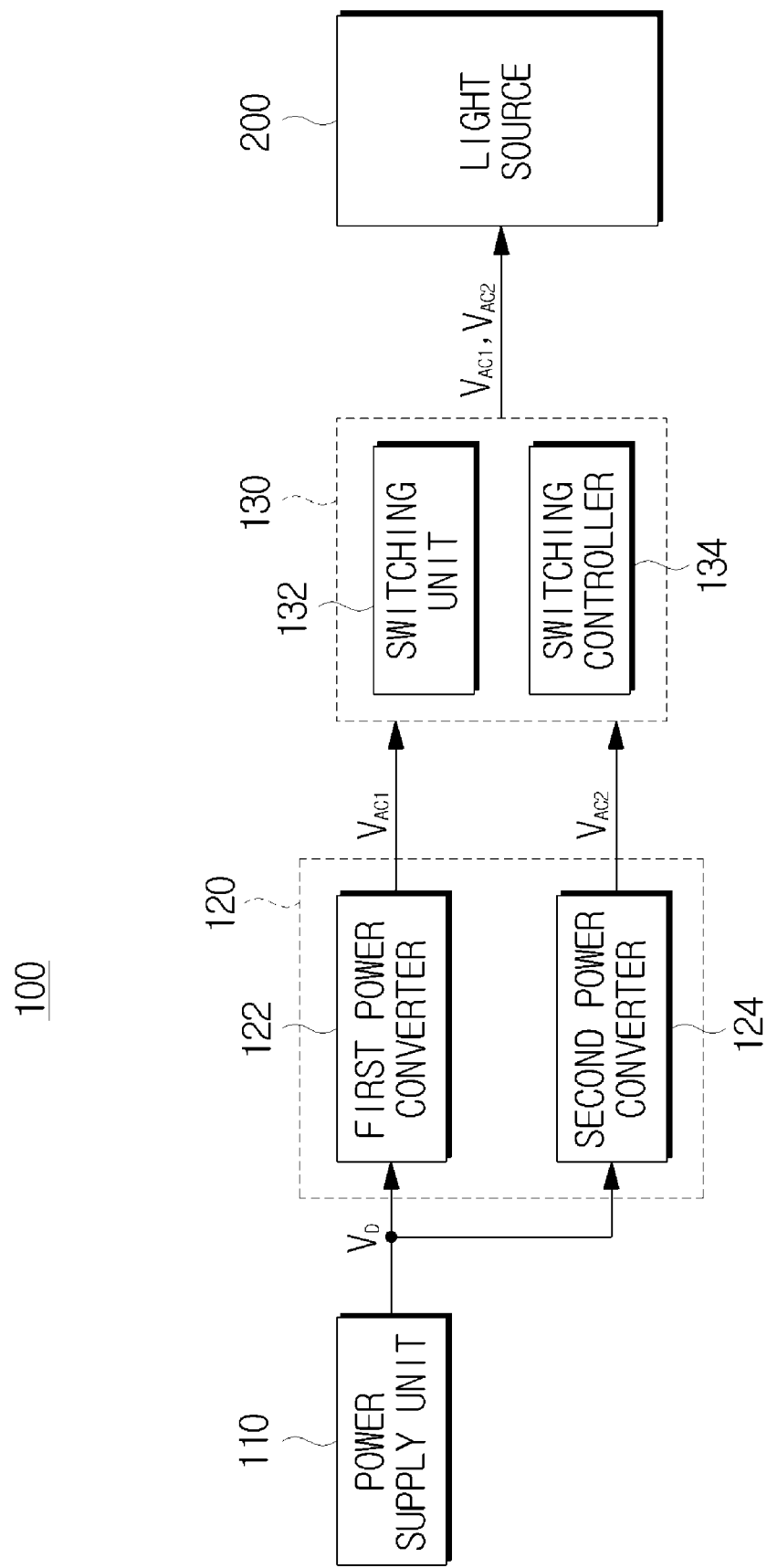
FIG. 1 is a block diagram of a light source driving apparatus according to an exemplary embodiment of the present invention.

FIG. 1 is a block diagram of a light source driving apparatus according to an exemplary embodiment of the present invention.

Referring to FIG. 1, a light source driving apparatus 100 according to an exemplary embodiment of the present invention includes a power supply unit 110 to supply alternating current (AC) power $V_{AC1}$, $V_{AC2}$ to a light source 200, a power converting unit 120 and a control unit 130. The light source 200 may be implemented as a surface light source device such as a Dielectric Barrier Discharge (DBD) lamp.

In particular, the power supply unit 110 may output direct current (DC) power $V_D$. For example, the power supply unit 110 may be implemented as a battery to output DC power or a rectifier circuit to convert externally supplied AC utility power into DC power.

The DC power $V_D$ may have a potential level of 24V or 120V. However, one will understand that the power supply unit 110 may be configured to output a variety of potential levels other than 24V or 120V.

The power converting unit 120 may include first and second converters 122, 124.

The first power converter 122 receives DC power $V_D$ from the power supply unit 110, generates a first AC power $V_{AC1}$ at a potential level suitable for driving the light source 200, and outputs the generated first AC power $V_{AC1}$.

The second power converter 124 also receives DC power $V_D$ from the power supply unit 110, generates a second AC power $V_{AC2}$ at a potential level suitable for driving the light source 200, and outputs the generated second AC power $V_{AC2}$.

The first and second AC powers $V_{AC1}$ and $V_{AC2}$ may be output in a sine wave signal at the same phase and periodicity.

The control unit 130 selectively controls the conversion of the first and second power converters 122, 124 from DC power $V_D$ into AC power $V_{AC1}$, $V_{AC2}$, and also controls alternate input of the first and second AC powers $V_{AC1}$, $V_{AC2}$ to the light source 200.

For example, if the light source 200 is implemented as a surface light source device such as a Dielectric Barrier Discharge (DBD) lamp, the light source 200 may include a first and second boards to receive the AC powers $V_{AC1}$, $V_{AC2}$ and generate plasma radiation, and a radiation region between the first and second boards at which a dielectric material such as radiating gas is provided. In one example of the exemplary embodiment of the present invention, the first board may receive the first AC power $V_{AC1}$, and the second board may receive the second AC power $V_{AC2}$. That is, the first board may operate as a first electrode to receive the first AC power $V_{AC1}$, and the second board may operate as a second electrode to receive the second AC power $V_{AC2}$.

The control unit 130 may include a switching unit 132. According to the operation of the switching unit 132, the second electrode may be connected with a ground electrode of the power supply unit 110, thereby causing the first AC power $V_{AC1}$ to flow to the light source 200, or the first electrode may be connected with a ground electrode of the power supply unit 110, thereby causing the second AC power $V_{AC2}$ to flow to the light source 200.

The control unit 130 may also include a switching controller 134 for outputting a switching signal to control the operation of the switching unit 132.

Whether the plasma radiation is generated by the supply of the first AC power $V_{AC1}$ to the light source 200, or by the supply of the second AC power $V_{AC2}$ to the light source 200, the first and second AC power $V_{AC1}$, $V_{AC2}$ of optimum pulse-width and length of pause suitable for the driving of the light source 200 are provided to the light source 200 in sequence and in inverse phase to each other.

Detailed examples of the light source driving apparatus 100 according to exemplary embodiments of the present invention will be explained below in greater detail.

Figure 2:
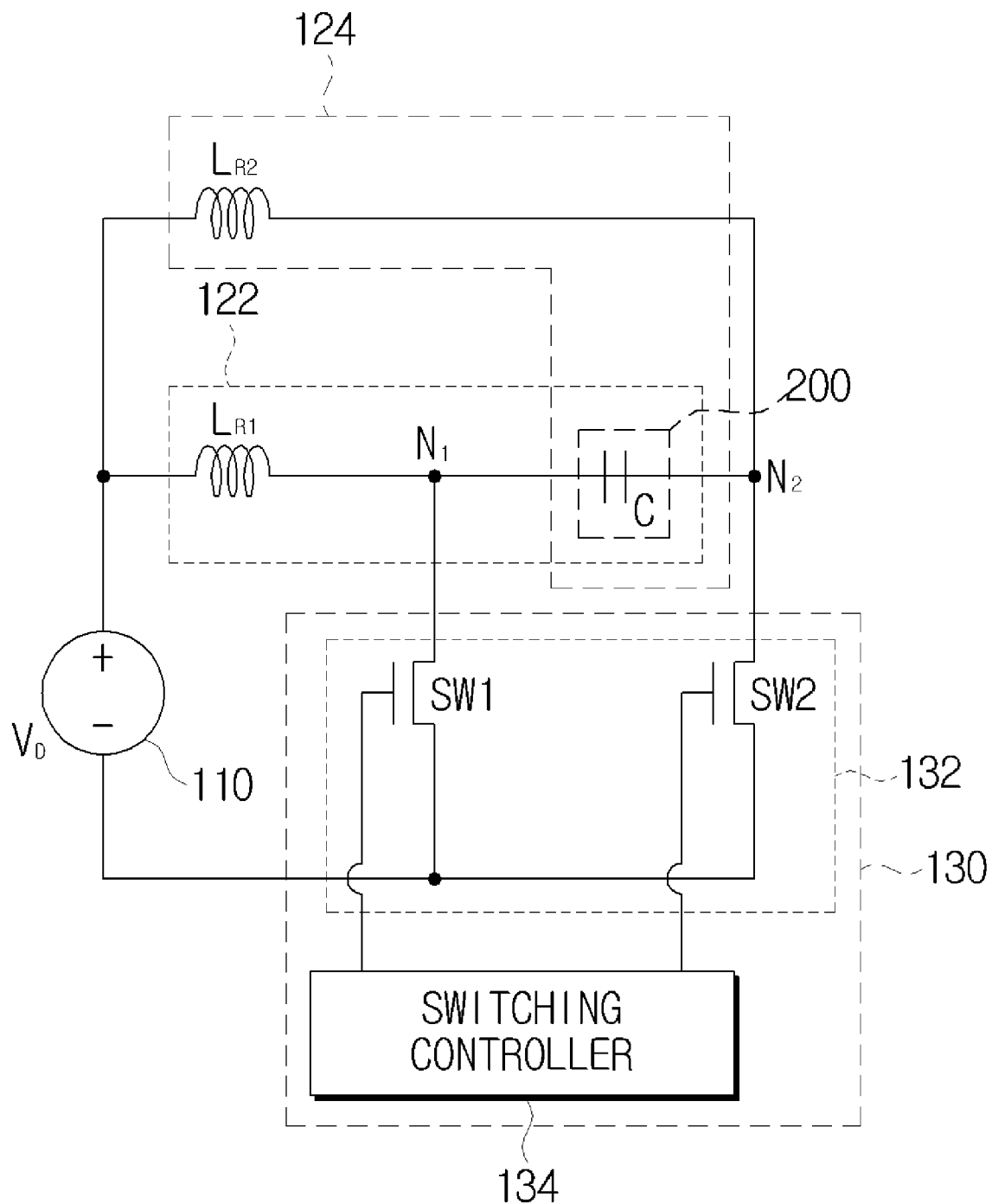
FIG. 2 is a circuit diagram of the light source driving apparatus of FIG. 1 according to an exemplary embodiment of the present invention.
Figure 3:
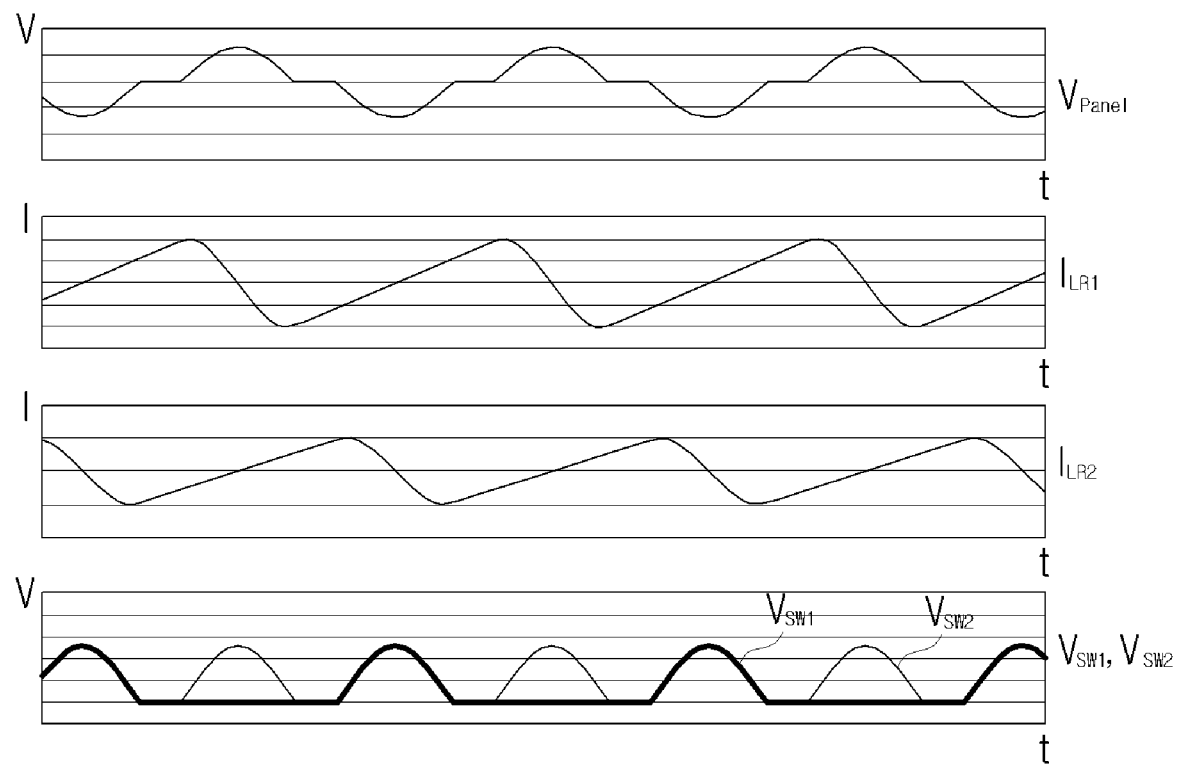
FIG. 3 is a waveform diagram representing the operation of the light source driving apparatus of FIG. 2.
Figure 4:
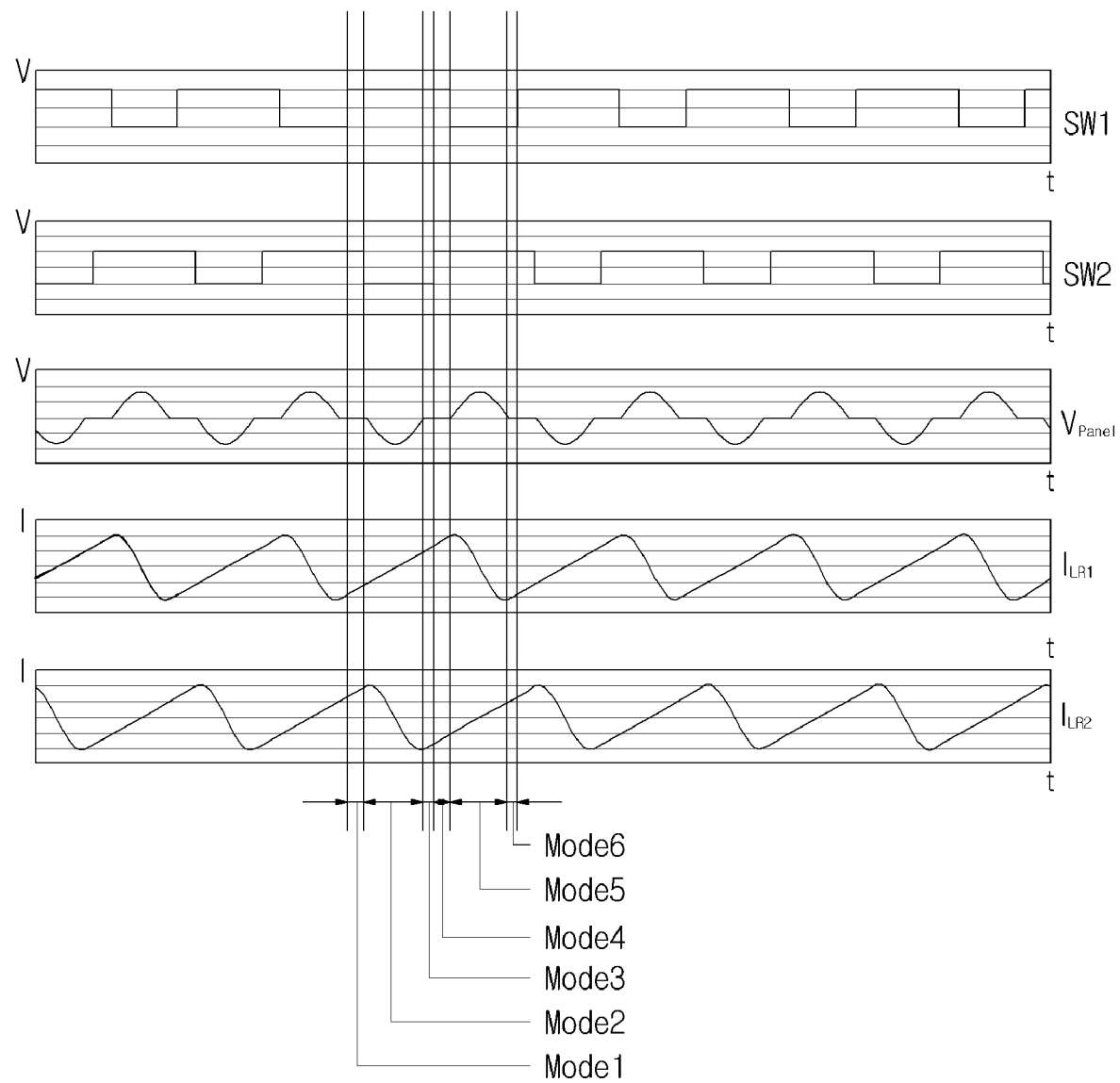
FIG. 4 is another waveform diagram representing the operation of the light source driving apparatus of FIG. 2.

FIG. 2 is a circuit diagram of the light source driving apparatus of FIG. 1 according to an exemplary embodiment of the present invention, FIG. 3 is a waveform diagram representing the operation of the light source driving apparatus of FIG. 2, and FIG. 4 is another waveform diagram representing the operation of the light source driving apparatus of FIG. 2.

Referring first to FIG. 2, a light source driving apparatus 100 according to an exemplary embodiment of the present invention includes a power supply unit 110, a power converting unit 120 and a control unit 130.

The power supply unit 110 may be implemented as a battery or a rectifier circuit, and outputs a DC power $V_D$ of a predetermined potential level.

The power converting unit 120 may include a first and second power converters 122, 124.

The first power converter 122 includes a resonant circuit having a first inductor $L_{R1}$ and a capacitor C, and operates to convert the DC power $V_D$ of the power supply unit 110 into a first AC power $V_{AC1}$ (e.g. sine wave) at a predetermined periodicity and pulsewidth.

The second power converter 124 includes a resonant circuit having a second inductor $L_{R2}$ and a capacitor C, and operates to convert the DC power $V_D$ of the power supply unit 110 into a second AC power $V_{AC2}$ (e.g. sine wave) at a predetermined periodicity and pulsewidth.

The capacitor C of the first and second power converters 122, 124 is the light source 200. That is, because the light source 200 may serve as a capacitor C which has a certain level of capacitance according to the first and second electrodes, and the dielectric element arranged between the first and second electrodes, the light source 200 may be used as a capacitor for LC resonance.

The control unit 130 includes the switching unit 132 and the switching controller 134.

The switching unit 132 includes a first switching unit SW1 connected with a first node $N_1$ between the first inductor $L_{R1}$ and the first electrode of the light source 200, to form, by switching, a ground potential GND of the power supply unit 110 according to the electric potential of the first node, that is, according to the electric potential of the first electrode of the light source 200, and a second switching unit SW2 connected with a second node $N_2$ between the second inductor $L_{R2}$ and the second electrode of the light source 200, to form, by switching, a ground potential GND of the power supply unit 110 according to the electric potential of the second node, that is, according to the electric potential of the second electrode.

If a switching element such as a metal oxide semiconductor (MOS) transistor is employed as the switching units SW1, SW2, the switching controller 134 may be implemented as a micro control unit (MCU) which selectively inputs a switching signal to a gate terminal of the MOS transistor.

Referring to FIGS. 2 to 4, the light source driving apparatus 100 may be driven in six modes (mode 1, mode 2, . . . , mode 6).

In the first driving mode (mode 1), the second switching unit SW2 is set in on-state under the control of the switching controller 134, and the first switching unit SW1 is turned on by the zero-voltage switching of the body diode and the parasitic capacitor of the switching element such as the MOS transistor. Accordingly, the zero-voltage switching prevents signal loss, or EMI noise in the switching operation. Because the zero-voltage switching in well known in the art, detailed explanation thereof will be omitted for the sake of brevity.

In the second driving mode (mode 2), the first switching unit SW1 is set in the on-state, and the second switching unit SW2 is turned off. Using the light source 200 as the capacitor, the second inductor $L_{R2}$, together with the light source 200, forms an LC resonant circuit. The second electrode of the light source 200, being connected with the second node $N_2$, has a positive polarity, and the first electrode of the light source 200, being connected with the first node $N_1$, has a negative polarity.

As a result, a current path is formed in the second driving mode (mode 2), connecting the second inductor $L_{R2}$, the light source 200 and the first switching unit SW1, such that electric current $I_{LR2}$ linearly increases and reaches a peak when the second switching unit SW2 is turned off, and then greatly decreases while flowing through the second inductor $L_{R2}$. DC power $V_D$ is converted into the second AC power $V_{AC2}$ such as sine wave of a predetermined periodicity and pulsewidth, according to the LC resonance. In this situation, electric current $I_{LR1}$, which has been linearly increasing since turning on the first switching unit SW1, flows through the first inductor $L_{R1}$.

In the third driving mode (mode 3), the potential difference between two ends of the light source 200 returns to 0V, when the light source 200 is discharged. That is, the electric potential of two ends of the light source 200 is clamped to 0V in the third driving mode (mode 3), according to the body diode of the switching element such as a MOS transistor of the second switching unit SW2.

In the fourth driving mode (mode 4), the second switching unit SW2 is turned on by the zero-voltage switching.

In the fifth driving mode (mode 5), the second switching unit SW2 is set in the on-state, and the first switching unit SW1 is turned off. Using the light source 200 as a capacitor, the first inductor $L_{R1}$, together with the light source 200 forms an LC resonant circuit, and the first electrode of the light source 200, being connected with the first node $N_1$, has a positive polarity, and the second electrode of the light source 200, being connected with the second node $N_2$, has a negative polarity.

As a result, a current path is formed in the fifth driving mode (mode 5), connecting the first inductor $L_{R1}$, the light source 200 and the second switching unit SW2, such that electric current $I_{LR1}$ linearly increases and reaches a peak when the first switching unit SW1 is turned off, and then greatly decreases while flowing through the second inductor $L_{R2}$. The DC power $V_D$ is converted into the first AC power $V_{AC1}$ such as sine wave of a predetermined periodicity and pulsewidth, according to the LC resonance. In this situation, electric current $I_{LR2}$, which has been linearly rising since turning on the second switching unit SW2, flows through the second inductor $L_{R2}$.

In the sixth driving mode (mode 6), the potential difference between two ends of the light source 200 returns to 0V, when the light source 200 is discharged. That is, the electric potential of two ends of the light source 200 is clamped to 0V in the sixth driving mode (mode 6), according to the body diode of the switching element such as a MOS transistor of the first switching unit SW1.

After that, bipolar current is alternately supplied to the light source 200, as the first to sixth driving modes (modes 1 to 6)

repeat, and a pause is guaranteed, while the bipolar current is alternately supplied as in the third and fourth driving modes (modes 3 and 4). Because bipolar current is supplied to the light source 200, bias stress is decreased, thereby lengthening the lifespan of the light source 200.

The peak voltage of the first and second AC powers $V_{AC1}$, $V_{AC2}$ being supplied to the light source 200, can be expressed by the following mathematical formula:

$$V_{AC|peak} = V_D + \frac{V_D(Ts - \pi\sqrt{L_R C_R})}{2}\sqrt{\frac{1}{L_R C_R}}$$ [Mathematical formula 1]

where Ts denotes a period corresponding to one cycle.

Referring to mathematical formula 1, a manufacturer of light source 200 may provide manufacture specification of the light source 200, including optimum pulsewidth, pause, and periodicity of pulses of respective types of radiation gases, to render the best driving efficiency, and accordingly, a designer may set values of the first and second inductors $L_{R1}$, $L_{R2}$ to obtain the optimum pulsewidth ($\pi\sqrt{L_R C_R}$), while ensuring a certain period of pause.

Figure 5:
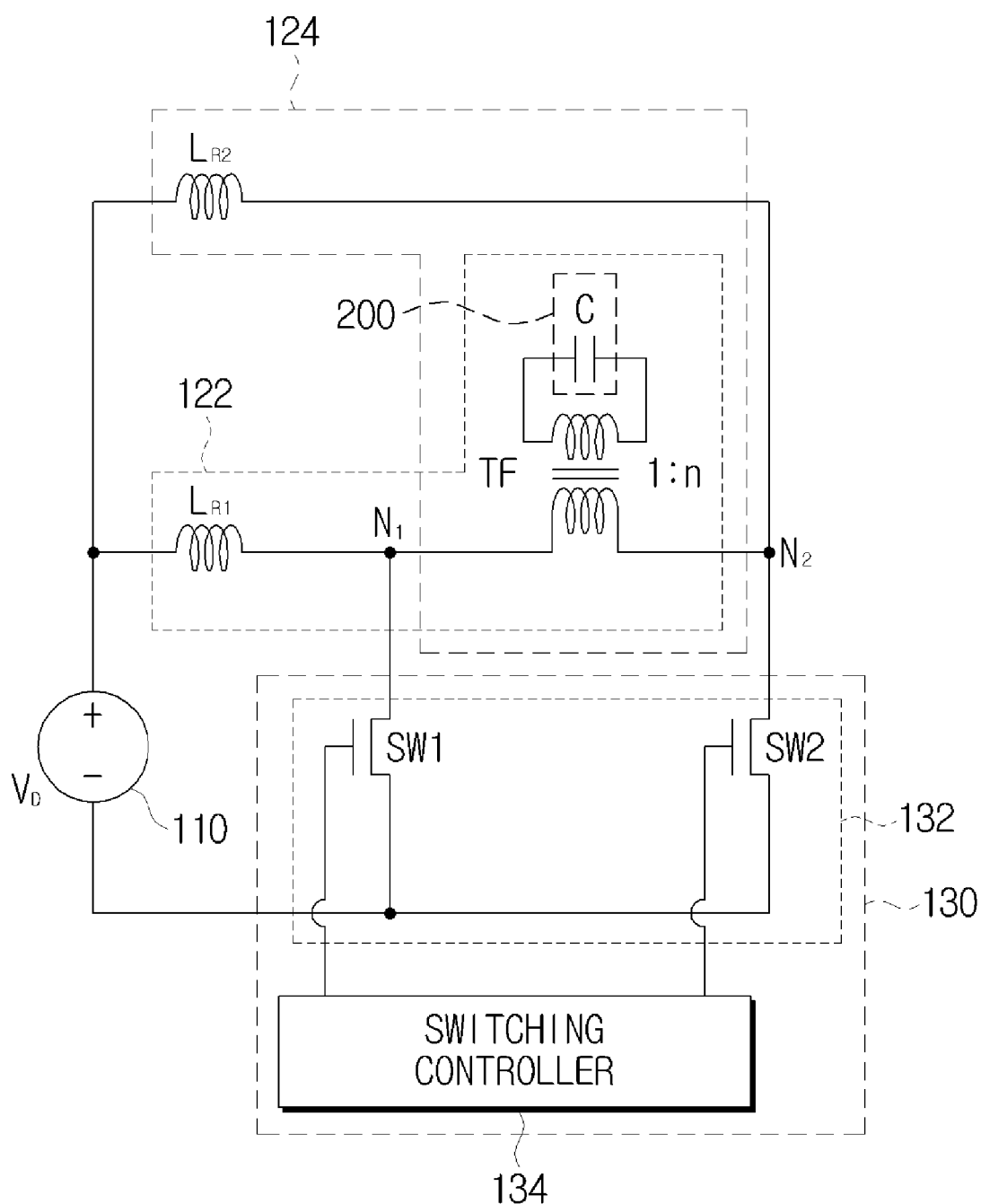
FIG. 5 is a circuit diagram of the light source driving apparatus of FIG. 1 according to another exemplary embodiment of the present invention.
Figure 6:
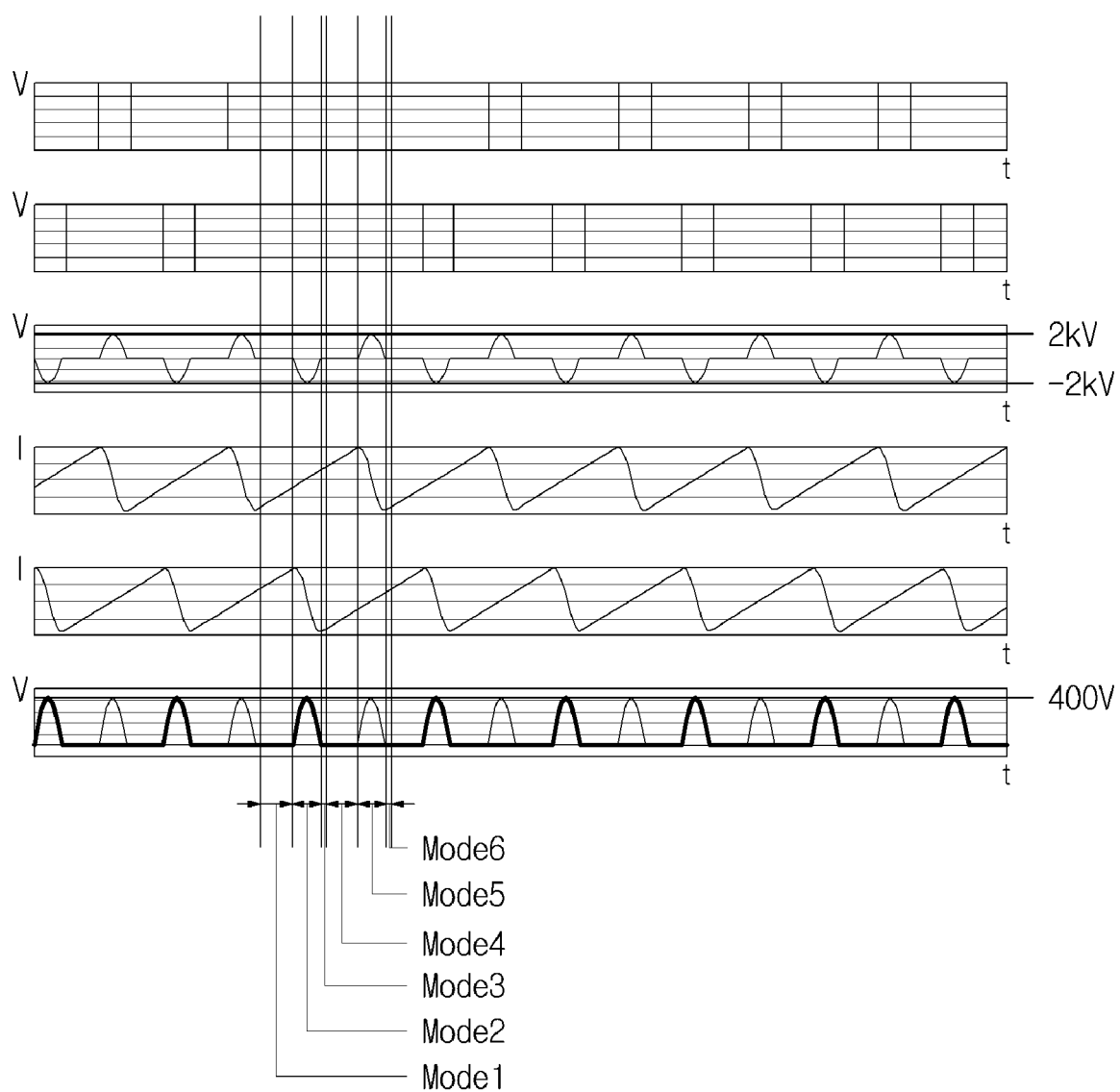
FIG. 6 is a waveform diagram representing the operation of the light source driving apparatus of FIG. 5.

FIG. 5 is a circuit diagram of the light source driving apparatus of FIG. 1 according to another exemplary embodiment of the present invention, and FIG. 6 is a waveform representing the operation of the light source driving apparatus of FIG. 5.

Referring to FIGS. 5 and 6, the light source driving apparatus 100 includes a power supply unit 110, a first power converting unit 120, a second power converting unit 130, and a control unit 140.

The elements of the light source driving apparatus 100 in the present embodiment are substantially identical to those of the above-described exemplary embodiment of FIG. 2, except for the first and second power converting units 122, 124. Accordingly, the similar elements will be referred to by the same reference numerals throughout, and the explanations about the overlapping parts or operations will be omitted for the sake of brevity.

The first power converting unit 122 includes a resonant circuit which includes a first inductor $L_{R1}$ and a capacitor C. The first power converting unit 122 converts DC power $V_D$ output to the power supply unit 110 into a first AC power $V_{AC1}$ such as sine wave having a predetermined periodicity. The first power converting unit 122 may include a booster circuit (TF) for boosting the first AC power $V_{AC1}$ of the light source 200 up to a predetermined level.

The second power converting unit 124 includes a resonant circuit having a second inductor $L_{R2}$ and a capacitor C. The second power converting unit 124 converts DC power $V_D$ output to the power supply unit 110 into second AC power $V_{AC2}$ such as sine wave having a predetermined periodicity. The second power converting unit 124 may also include a booster circuit (TF) for boosting the second AC power $V_{AC2}$ of the light source 200 up to a predetermined level.

The first and second power converting units 122, 124 may share one booster circuit (TF).

Referring to the construction as illustrated in FIG. 5, if 2 kV of AC power is required to cause plasma radiation of the light source 200 (see FIG. 6), 2 kV of voltage is supplied to the first and second nodes $N_1$, $N_2$ in the second and fifth driving modes (modes 2 and 5).

If the construction illustrated in FIG. 2 is put in the same condition as the above, the switching elements of the first and second switching units SW1, SW2 connected with the first and second nodes $N_1$, $N_2$, may be implemented with the elements which are strong enough to resist approximately 2 kV of internal voltage.

The construction including the booster circuit (TF) illustrated in FIG. 5 may alternatively employ approximately 400V-resistant switching elements in the first and second switching units SW1, SW2, because approximately 400V of potential may be enough for the first and second nodes $N_1$, $N_2$ under the same condition as illustrated in FIG. 6, if a transformer having turn ratio of 1:5 is provided. This may reduce cost for fabricating switch elements. Furthermore, because bipolar power is supplied to the light source 200, bias stress is reduced, and the lifespan of the light source 200 is prolonged.

The peak voltage of the first and second AC powers $V_{AC1}$, $V_{AC2}$ being supplied to the light source 200, can be expressed by the following mathematical formula:

$$V_{AC|peak} = nV_D + \frac{V_D(Ts - n\pi\sqrt{L_R C_R})}{2}\sqrt{\frac{1}{L_R C_R}}$$ [Mathematical formula 2]

where, n denotes the turn ratio of the primary and secondary coils of the booster circuit (TF).

Referring to mathematical formula 2, a manufacturer of light source 200 may provide manufacture specification of the light source 200, including optimum pulsewidth, pause, and periodicity of pulses of respective types of radiation gases, to render the best driving efficiency, and accordingly, a designer may set values of the first and second inductors $L_{R1}$, $L_{R2}$ to obtain the optimum pulsewidth ($\pi\sqrt{L_R C_R}$), while ensuring a certain period of pause. The designer may also selectively set different turn ratios for internal voltage of the different switching elements to further reduce the manufacture cost.

Figure 7:
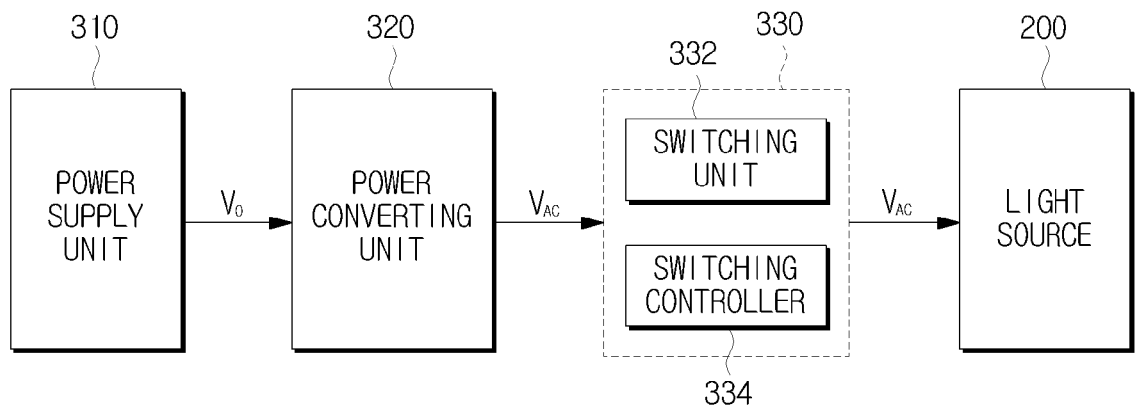
FIG. 7 is a block diagram of a light source driving apparatus according to another exemplary embodiment of the present invention.
Figure 8:
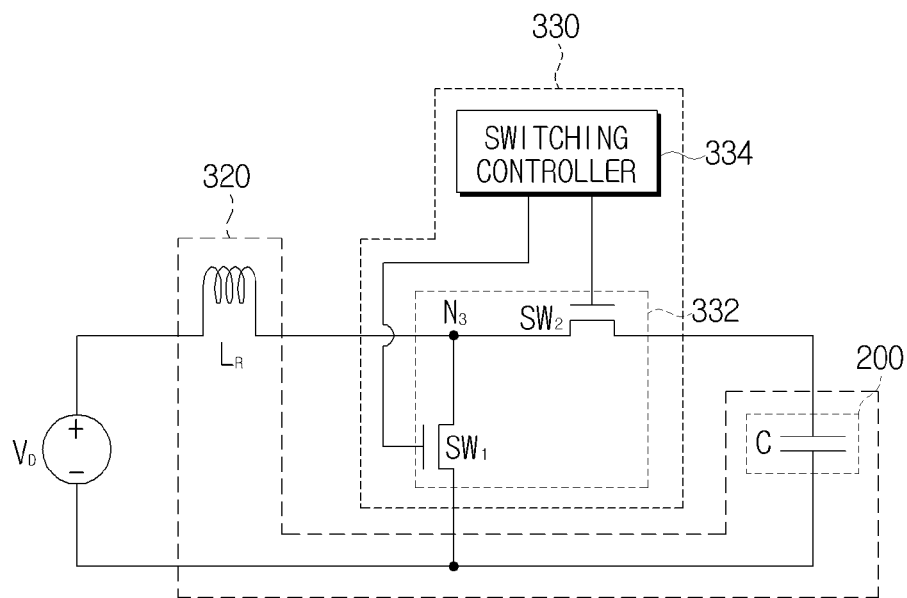
FIG. 8 is a circuit diagram of the light source driving apparatus of FIG. 7.
Figure 9A:
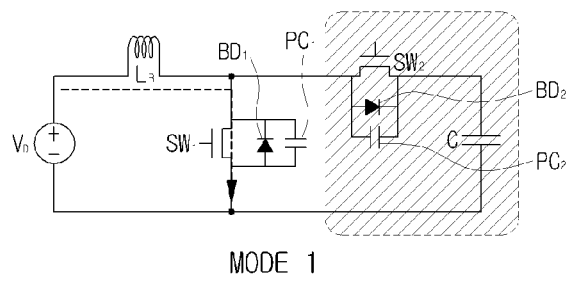
FIGS. 9A to 9G are circuit diagrams illustrating the operation of the light source driving apparatus of FIG. 8.
Figure 9B:
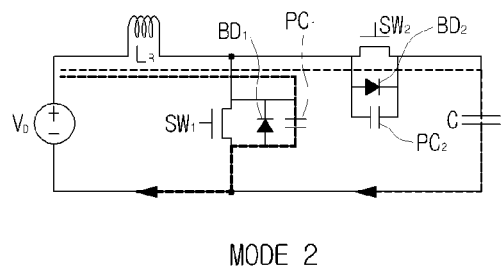
Figure 9C:
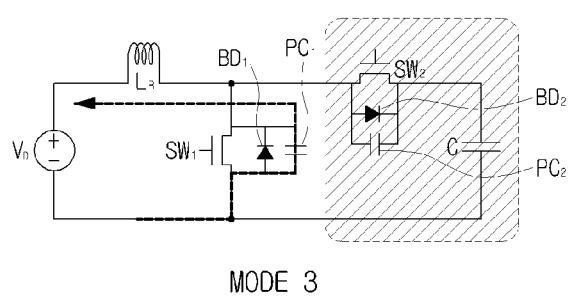
Figure 9D:
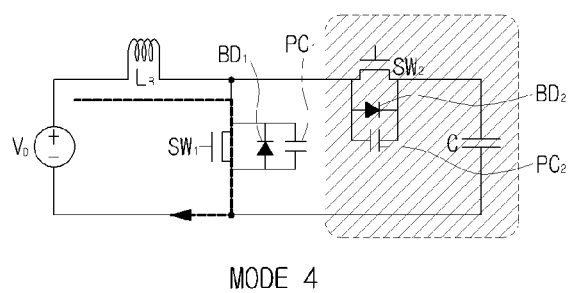
Figure 9E:
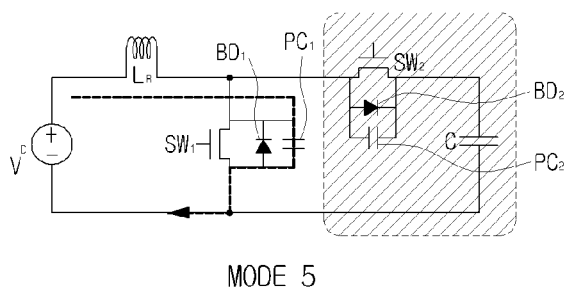
Figure 9F:
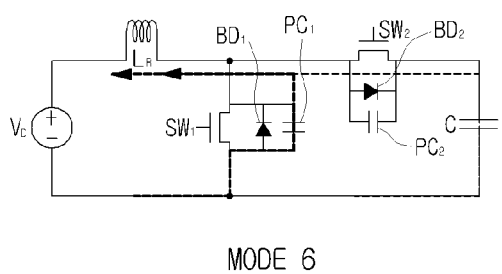
Figure 9G:
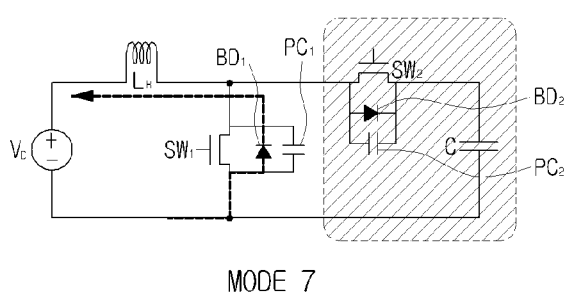
Figure 10:
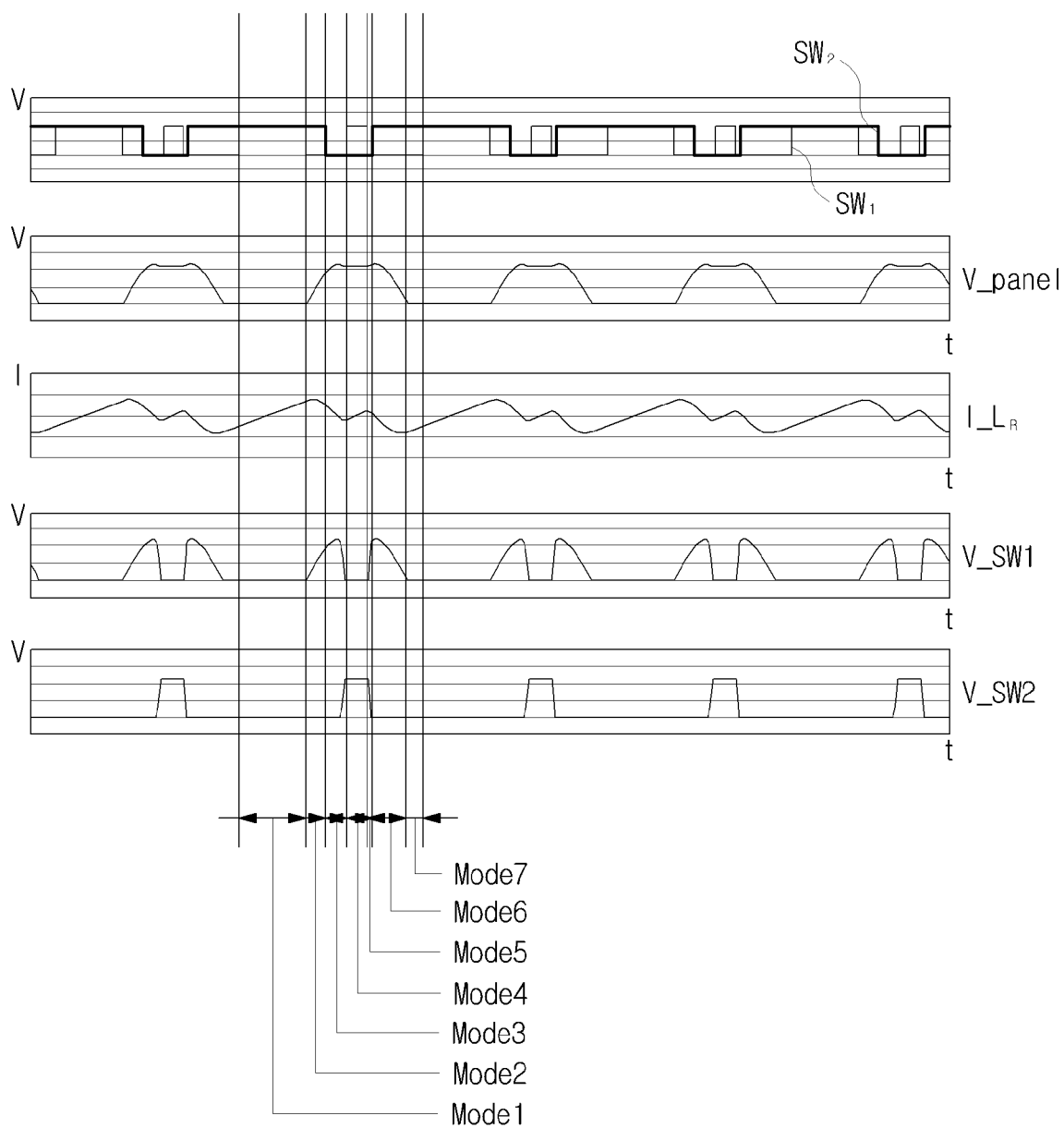
FIG. 10 is a waveform diagram representing the operation of the light source driving apparatus of FIG. 8.

FIG. 7 is a block diagram of a light source driving apparatus according to another exemplary embodiment of the present invention, FIG. 8 is a circuit diagram of the light source driving apparatus of FIG. 7, FIGS. 9A to 9G are circuit diagrams illustrating the operation of the light source driving apparatus of FIG. 8, and FIG. 10 is a waveform representing the operation of the light source driving apparatus of FIG. 8.

Referring to FIG. 7, a light source driving apparatus 300 according to an exemplary embodiment of the present invention includes a power supply unit 310 to feed alternating current (AC) power $V_{AC}$ to a light source 200, a power converting unit 320 and a control unit 330. The light source 200 may be implemented as a surface light source device such as a DBD lamp.

In particular, the power supply unit 310 may output DC power $V_D$. The power supply unit 310 in the present exemplary embodiment has the substantially same construction as that of the above exemplary embodiment explained with reference to FIG. 2, and therefore, detailed explanations about the overlapping parts or operations will be omitted for the sake of brevity.

The power converting unit 320 receives DC power $V_D$ from the power supply unit 310, generates AC power VAC having a potential level suitable for the driving of the light source 200, and outputs the generated AC power VAC.

The control unit 330 includes a switching unit 332 and a switching controller 334.

The switching unit 332 controls the electric current being input to the light source 200 by switching operation, such that DC power $V_D$ is converted into AC power VAC by the power converting unit 320. The switching unit 332 also performs necessary switching operations such that, when the DC power $V_D$ is converted into AC power VAC at the power converting unit 320 according to the control of the switching controller 334, the AC power has the pulsewidth and length of pause suitable for the optimum driving of the light source 200, and stays at a predetermined level of peak value for a predetermined time period.

If a switching element such as an MOS transistor is employed as the switching units SW1, SW2, the switching controller 334 may be implemented as an MCU which selectively inputs a switching signal to a gate terminal of the MOS transistor.

The light source driving apparatus 300 according to an exemplary embodiment of the present invention will be explained below in greater detail.

Referring to FIG. 8, the light source driving apparatus 300 includes a power supply unit 310, a power converting unit 320 and a control unit 330.

In particular, the power supply unit 310 may include a battery or a rectifier circuit, and outputs a DC power $V_D$.

The power converting unit 320 includes a resonant circuit having an inductor $L_R$ and a capacitor C, and operates to convert the DC power $V_D$ of the power supply unit 310 into a first AC power $V_{AC1}$ (e.g., sine wave) at a predetermined periodicity and pulsewidth.

The capacitor C of the power converting unit 320 is the light source 200. That is, because the light source 200 may serve as a capacitor C which has a certain level of capacitance according to the first and second electrodes, and the dielectric element arranged between the first and second electrodes, the light source 200 may be used as a capacitor for LC resonance.

The control unit 330 includes the switching unit 332 and the switching controller 334.

The switching unit 332 includes a first switching unit SW1 connected with a third node $N_3$ between the inductor $L_R$ and the first electrode of the light source 200, to form, by switching, a ground potential GND of the power supply unit 110 according to the electric potential of the first node, that is, according to the electric potential of the first electrode of the light source 200, and a second switching unit SW2 connected with a second node $N_2$ between the second inductor $L_{R2}$ and the second electrode of the light source 200, to form, by switching, a ground potential GND of the power supply unit 110 according to the electric potential of the second node, that is, according to the electric potential of the second electrode.

If a switching element such as an MOS transistor is employed as the switching units SW1, SW2, the switching controller 334 may be implemented as an MCU which selectively inputs a switching signal to a gate terminal of the MOS transistor.

The switching controller 334 controls the electric current being input to the light source 200 by switching operation, such that DC power $V_D$ is converted into AC power VAC by the power converting unit 320. The switching unit 332 also performs necessary switching operations such that a switching signal is selectively provided to the first and second switching units SW1, SW2 to cause the AC power to have the pulsewidth and length of pause suitable for the optimum driving of the light source 200, and to stay at a predetermined level of peak value for a predetermined time period.

Referring to FIGS. 8 to 10, the light source driving apparatus 300 may be driven in seven modes (mode 1, mode 2, . . . , mode 7).

In the first driving mode (mode 1) shown in FIG. 9A, when the first switching unit SW1 is set in the on-state under the control of the switching controller 334, the current being supplied from the power supply unit 310 flows a current path connecting the inductor LR and the first switching unit SW1, and the electric current flowing the inductor LR increases linearly.

In the second driving mode (mode 2) shown in FIG. 9B, when the first switching unit SW1 is turned off and the second switching unit SW2 is turned on, the parasitic capacitor (PC1) of the first switching unit SW1 is charged, and the capacitor C of the light source 200 is also charged by the electric path connecting the inductor LR and the second switching unit SW2.

In the third driving mode (mode 3) shown in FIG. 9C, when the light source 200 reaches a predetermined discharge level, the light source 200 emits a ray of light by plasma radiation. It is also in the third driving mode (mode 3) that the capacitor C of the light source 200 is charged to the maximum level, and the first and second switching units SW1, SW2 are turned off. In this situation, the electric potential charged in the capacitor C is relatively at a higher level than the power $V_D$, and as a result, a reverse bias is applied to the inductor LR. Accordingly, electric current is in reverse direction in the inductor LR, and the parasitic capacitor PC1 of the first switching unit SW1 is discharged in the third driving mode (mode 3).

In the fourth driving mode (mode 4) shown in FIG. 9D, the first switching unit SW1 is turned on, and the second switching unit SW2 stays in the off-state. As a result, electric current linearly increases in the inductor. Because the body diode BD1 of the first switching unit SW1 is turned on when the parasitic capacitor PC1 of the first switching unit SW1 is completely discharged between the third and fourth driving modes (modes 3 and 4), the first switching unit SW1 is zero-voltage switched in the fourth driving mode (mode 4).

In the fifth driving mode (mode 5) shown in FIG. 9E, as the first switching unit SW1 is turned off, the parasitic capacitor PC1 of the first switching unit SW1 starts recharging.

In the sixth driving mode (mode 6) shown in FIG. 9F, the first switching unit SW1 stays in the off-state, and as the second switching unit SW2 is turned on, the capacitor C of the light source 200 starts discharging. The capacitor C keeps discharging until the electric current is formed in the reverse direction. If the voltage of the first switching unit SW1 exceeds the level of the voltage supplied to the light source 200 between the fifth and sixth driving modes (modes 5 and 6), the body diode BD2 of the second switching unit SW2 is turned on, and as a result, the second switching unit SW2 is zero-voltage switched in the sixth driving mode (mode 6).

The potential at the two ends of the light source 200 is clamped to 0V by the body diode (BD1) of the first switching unit SW1 in the sixth driving mode (mode 6).

In the seventh driving mode (mode 7) shown in FIG. 9G, the first switching unit SW1 stays in the off-state, and the second switching unit SW2 stays in the on-state, and as a result, the electric current continuously flows through the body diode BD1 of the first switching unit SW1.

After that, unipolar power is supplied to the light source 200, as the first to seventh driving modes (modes 1 to 7) repeat. A light source driving apparatus 300 according to the exemplary embodiment of the present invention, because the peak level of the AC power being supplied to the light source 200 is maintained for a predetermined time period, time for discharging the capacitor C of the light source 200 is taken into a consideration, and therefore, efficiency of the light source 200 is improved. Furthermore, sufficient length of pause time is guaranteed when the unipolar power is supplied to the light source 200.

Figure 11:
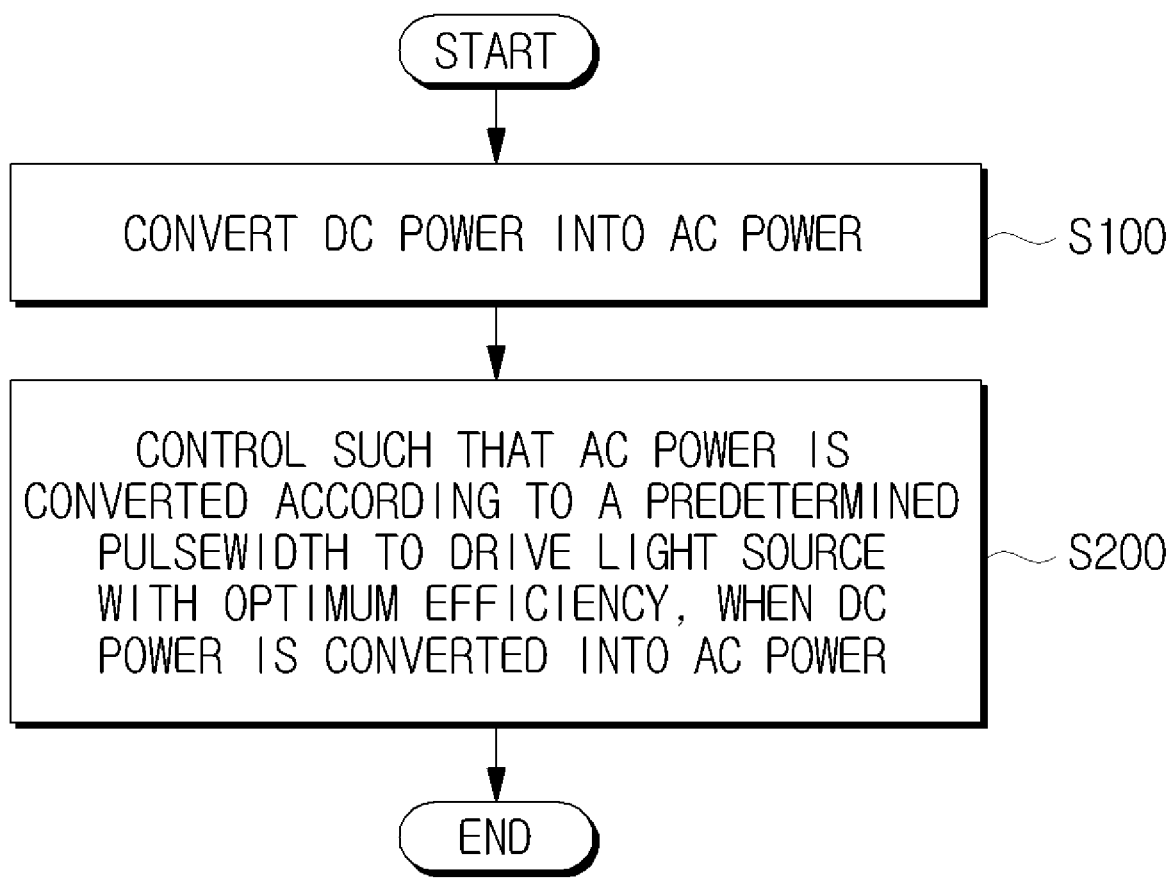
FIG. 11 is a flowchart illustrating a method of driving a light source according to an exemplary embodiment of the present invention.

FIG. 11 is a flowchart illustrating a method of driving a light source according to an exemplary embodiment of the present invention.

Referring to FIG. 11, a method for driving a light source according to an exemplary embodiment of the present invention includes converting DC power into AC power (S100), and controlling (S200) such that the DC power is converted into AC power according to a predetermined pulse wave and drive the light source under optimum condition.

A method for driving a light source 100 will be explained below with reference to FIGS. 2 to 6 and 11.

At operation S100, if the second switching unit SW2 of the control unit 130 is turned on according to the fourth driving mode (mode 4) as shown in FIG. 4, and if the first switching unit SW1 is turned off in the fifth driving mode (mode 5), the first power converter 122 converts DC power $V_D$ into first AC power $V_{AC1}$ (e.g., sine wave) having a predetermined periodicity and pulsewidth, using a resonant circuit having a first inductor $L_{R1}$ and a capacitor C.

At operation S100, if the first switching unit SW1 of the control unit 130 is in on state according to the second driving mode (mode 2) as shown in FIG. 4, and if the second switching unit SW2 is turned off in the third driving mode (mode 3), the second power converter 124 converts DC power $V_D$ into second AC power $V_{AC2}$ (e.g., sine wave) having a predetermined periodicity and pulsewidth, using a resonant circuit having a second inductor $L_{R2}$ and a capacitor C.

At operation S200, the control unit 130 controls, by switching, the power conversion of the first and second power converters 122, 124, by selectively forming a ground potential GND according to the first or second node $N_1$, $N_2$, and causes the light source 200 to drive according to the sixth driving modes (modes 1 to 6) explained above.

The six driving modes (modes 1 to 6) have been explained above, and therefore, will not be explained below for the sake of brevity.

If a booster circuit (TF) is provided, the first and second AC powers $V_{AC1}$, $V_{AC2}$, which is stepped up from the DC power $V_D$ by a predetermined level, may be generated at operations S100, S200.

According to the exemplary embodiment explained above, bipolar power in sine wave formation can be alternately supplied to the light source 200, the pulsewidth can be variably formed to suit for the specification of the light source 200, and a pause period is guaranteed while the bipolar power is being supplied. Furthermore, because bipolar power is supplied to the light source 200, bias stress is reduced, and the light source 200 can have a longer lifespan.

A method for driving a light source 300 according to another exemplary embodiment of the present invention will be explained with reference to FIGS. 7 to 11.

At operation S100, if the second switching unit SW2 of the control unit 330 is in on state according to the second and sixth driving modes (modes 2 and 6) and if the first switching unit SW1 is in off state as shown in FIG. 10, the power converting unit 320 converts DC power $V_D$ into AC power $V_{AC}$ using a resonant circuit including an inductor LR and a capacitor C.

At operation S200, as the second switching unit SW2 of the control unit 330 is in off state according to the third to fifth driving modes (modes 3 to 5), AC power VAC, which has a peak level for a predetermined time period, is supplied to the light source 200. The respective switching units SW1, SW2 are also zero-voltage switched according to the body diode and parasitic capacitor. AC power VAC being supplied to the light source 200 by the body diode of the first switching unit SW1, is clamped to 0V in the seventh driving mode (mode 7) such that unipolar power is supplied to the light source 200.

According to the exemplary methods for driving light source explained above, because the peak level of the AC power being supplied to the light source 200 is maintained for a predetermined time period, time for discharging the capacitor C of the light source 200 is taken into a consideration, and the efficiency of the light source 200 is improved. Furthermore, sufficient length of pause time is guaranteed when the unipolar power is supplied to the light source 200. Furthermore, time for maintaining the peak level of AC power VAC and the pulsewidth can be variably set to suit for the specification of the light source 200.

In the above exemplary embodiment, operations at S100 and S200 were explained as being performed sequentially, such that DC power is converted into AC power, and the AC power is converted according to a predetermined pulse wave which will drive the light source with the best efficiency. However, this should not be construed as limiting. In a practical application, the operations at S100 and S200 are performed in association with each other. That is, as the switching units SW1, SW2 perform switching according to the control of the control unit 130, 330, AC power is generated and supplied to the light source 200, plasma radiation is generated within the predetermined potential level of the first AC power $V_{AC1}$, and the ray of light is emitted.

Figure 12:
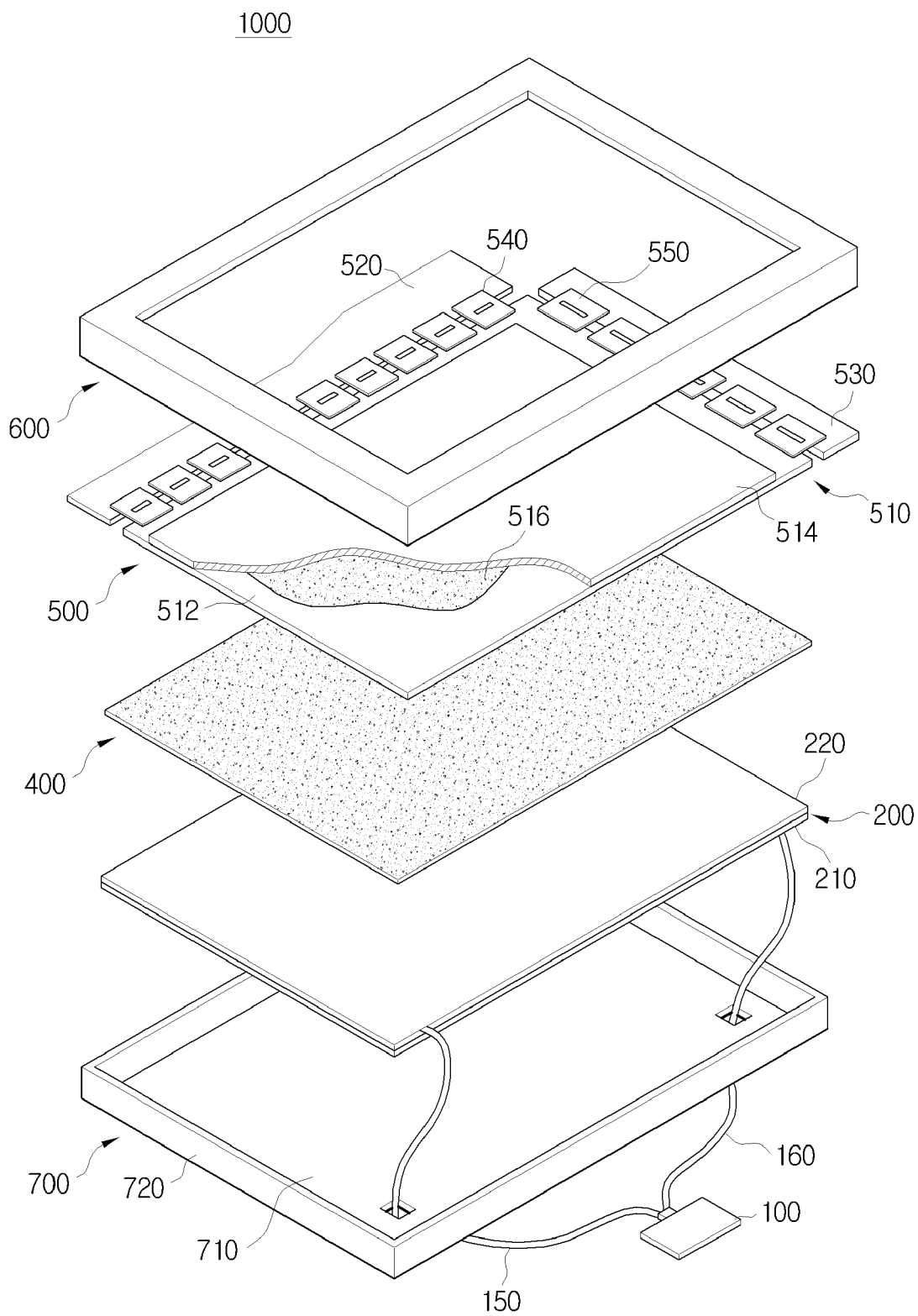
FIG. 12 is an exploded perspective view of a display apparatus employing a light source driving apparatus according to an exemplary embodiment of the present invention.

FIG. 12 is an exploded perspective view of a display apparatus employing a light source driving apparatus according to an exemplary embodiment of the present invention.

Referring to FIG. 12, a display apparatus 1000 according to an exemplary embodiment of the present invention includes a light source driving unit 100, a light source 200, a display unit 400, and a receptacle 600.

The light source driving unit 100 has the substantially same construction as those 100, 300 explained above according to the exemplary embodiments of the present invention with reference to FIGS. 1 to 10. FIG. 12 particularly illustrates the light source driving apparatus 100 of FIG. 1 as an example of the light source driving unit 100. Accordingly, detailed explanations about the overlapping parts of operations will be omitted below for the sake of brevity.

The light source 200 may be implemented as a surface light source device which includes a first board 210, and a second board 220 engaged with the first board 210 in a manner of defining a space therebetween.

The first and second boards 210, 220 each may be a substantially rectangular plate, which passes visible rays and blocks ultraviolet rays. The first and second boards 210, 220 may be engaged with each other by a bonding means such as a fused lead glass for example, and the space between the first and second boards 210, 220 serves as a radiating area where a radiation gas for plasma radiation is filed in.

The display unit 500 includes an LCD panel 510 for displaying an image, and data and gate printed circuit boards 520, 530 for providing a driving signal for the LCD panel 510. A driving signal provided by the data and gate printed circuit boards 520, 530 is supplied to the LCD panel 510 through a data tape carrier package (TCP) 540, and a gate TCP 550.

The LCD panel 510 includes a thin film transistor (TFT) board 512, a color filter board 514 faced with and engaged with the TFT board 512, and an LCD 516 interposed between the above two boards 512, 514.

The TFT board 512 may be a substantially transparent glass board, which includes a matrix type of TFT (not shown) as a switching element. A data and gate lines are connected with the source and gate terminals of the TFTs, and a pixel electrode (not shown) made of transparent and conductive material is connected with the drain terminal.

The color filter board 514 includes RGB pixel (not shown) formed by thin film processing. The color filter board 514 also includes a shared electrode (not shown) which is made of transparent and conductive material.

In the LCD panel 510 constructed as explained above, if power is supplied to the gate terminal of the TFT, thereby turning on the TFT, an electric field is formed between the pixel electrode and the shared electrode. Due to the electric field as generated, the arrangement of the LCD 516 interposed between the TFT board 512 and the color filter board 514 changes, and the permissivity of the light from the light source 200 changes according to the arrangement change of the LCD 516. As a result, an image with a desired gray level is obtained.

The receptacle 700 includes a bottom 710 for mounting the light source 200, and a plurality of sidewalls 720 extending from the edges of the bottom 710 to form a space therewithin. The sidewalls 720 may substantially vertically extend from the edges of the bottom 710, and contact the four sides of the light source 200 when the light source 200 is received therein to prevent undesirable movement of the light source 200.

The display apparatus 1000 may also include a fixing member 600 for fixing an optical member 400 for improving characteristics of the light emitted from the light source 200, and the LCD panel 510.

The optical member 400 may be arranged between the light source 200 and the LCD panel 510. The optical member 400 may change the path of the light being emitted from the light source 200, and so improve the brightness regularity, or front brightness. To this end, the optical member 400 may include a diffusing plate (not shown) for diffusing a light from the light source 200, a light focusing sheet (not shown) disposed above the diffusing plate for focusing the light from the diffusing plate towards the LCD panel 510 and thus improving the front brightness of the light, and a diffusing sheet (not shown) disposed above or below the focusing sheet (not shown) for diffusing the light.

The fixing member 600 is fixed to the receptacle 700 and surrounds the edges of the LCD panel 510, to thereby fix the LCD panel 510 onto the upper part of the optical member 400. The fixing member 600 prevents breakage of the LCD panel 510, and escape of the LCD panel out of the receptacle 700.

Although not illustrated, the display apparatus 1000 may additionally include another fixing means for fixing the light source 200 and the optical member 400 in the receptacle 700, and also for guiding the direction of mounting the LCD panel 510 in the receptacle 700.

According to the exemplary embodiments of the present invention, bipolar AC power, which is easy to design a length of pause time and pulsewidth, is used to improve the driving efficiency of the light source 200 and prolong the lifespan of the light source 200.

Furthermore, unipolar AC power, which is easy to design a length of pause time and pulsewidth, is used, such that time for charging or discharging the light source 200 is considered fully, and driving efficiency of the light source 200 is improved.

Furthermore, a designer may form a pulsewidth and the length of pause time of the AC power to maximize the driving efficiency of the light source according to the types of radiation gases being used. As a result, the light sources of different specifications of AC pulsewaves can be used with optimum efficiency.

Furthermore, the structure of the light source driving apparatus is simplified, thereby reducing product size and cost.

While certain exemplary embodiments of the present invention have been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. An apparatus for driving a light source, the apparatus comprising:
   a power converting unit which converts a direct current (DC) power into an alternating current (AC) power for driving the light source; and
   a control unit which controls the power converting unit to convert the DC power into the AC power according to a pulsewave,
   wherein the control unit controls the power converting unit to pause providing AC power to the light source for a predetermined duration between each pulse of the AC power.

2. The apparatus of claim 1, wherein the control unit controls at least one of a phase, a pulsewidth, and the duration of the pause of the AC power, so that the AC power is converted according to the pulsewave.

3. The apparatus of claim 1, further comprising a power supply unit which provides the DC power.

4. The apparatus of claim 1, wherein the power converting unit comprises:
   a first power converter which converts the DC power into a first AC power; and
   a second power converter which converts the DC power into a second AC power, and
   wherein the control unit controls the first and second power converters so that the DC power is sequentially converted into the first AC power and the second AC power, and the first AC power and second AC power are sequentially input to the light source, and have a length of pause time according to the pulsewave and a phase reverse to each other.

5. The apparatus of claim 4, wherein the control unit controls the power converting unit so that the first electrode of electrodes receiving the first AC power and the second AC power receives an electric potential which is higher than that of the second electrode of the electrodes in an alternating order, and that the first power and the second power are sequentially converted.

6. The apparatus of claim 5, wherein the control unit causes the electric potential of the first electrode to be formed according to the first power and the second power, and causes the electric potential of the second electrode to be formed according to a ground power.

7. The apparatus of claim 4, wherein each of the first power converter and the second power converter comprises a resonant circuit comprising at least one inductor element and a capacitor element.

8. The apparatus of claim 7, wherein the capacitor element comprises the first electrode and the second electrode of the light source, and a dielectric material arranged between the first and the second electrodes.

9. The apparatus of claim 7, wherein the control unit comprises:
   a switching unit which causes the resonant circuit of the first power converter and the resonant circuit of the second power converter to resonate sequentially; and
   a switching controller which generates a switching signal to control switching of the switching unit.

10. The apparatus of claim 9, wherein the switching unit comprises a first switch and a second switch,
   the apparatus comprises a first node which directly connects the first electrode of the light source to a terminal of the inductor element of the first power converter and a second node which directly connects the second electrode of the light source to a terminal of the inductor element of the second power converter, when the first switch is in an ON state, the first switch connects the first node to ground such that the second AC power is input to the light source, and when the second switch is in an ON state, the second switch connects the second node to the ground such that the first AC power is input to the light source.

11. The apparatus of claim 10, wherein another terminal of the inductor element of the first power converter and another terminal of the inductor element of the second power converter are both connected directly to a same DC power source.

12. The apparatus of claim 7, wherein the capacitor element of the first power converter and the capacitor element of the second power converter is the light source, which is shared between the first power converter and the second power converter.

13. The apparatus of claim 4, wherein each of the first power converter and the second power converter comprises a booster circuit which boosts the first and second AC powers.

14. The apparatus of claim 13, wherein the booster circuit of the first power converter is the same as the booster circuit of the second power converter.

15. The apparatus of claim 1, wherein the power converting unit comprises a resonant circuit comprising at least one inductor element and a capacitor element.

16. The apparatus of claim 15, wherein the capacitor element comprises the first electrode and the second electrode of the light source, and a dielectric material arranged between the first and the second electrodes.

17. The apparatus of claim 16, wherein the control unit comprises:

a first switching unit which selectively provides electric current to the light source by switching;

a second switching unit which causes the DC power to be converted into the AC power by the resonant circuit based on operation of the first switching unit, and controls a charging potential of the capacitor element such that the AC power has a pulsewidth of a potential according to the pulsewave; and a switching controller which generates a switching signal to control the switching of the first and second switching units.

18. The apparatus of claim 17, wherein the control unit controls the switching of the first and second switching units to cause the AC power to have the pause according to the pulsewidth.

19. The apparatus of claim 17, wherein the capacitor element of the power converting unit is the light source.

20. The apparatus of claim 17, further comprising a node which directly connects a terminal of the at least one inductor to the second switching unit, when the first switching unit is in an ON state, the first switching unit connects the node to ground, and when the second switching unit is in an ON state, the second switching unit connects the node to the first electrode of the light source.

21. An apparatus for driving a light source, the apparatus comprising:

a first electrode;

a second electrode;

a dielectric material interposed between the first and second electrodes, wherein the light source is driven by a first alternating current (AC) power and a second AC power supplied to the first and second electrodes;

a power supply unit which outputs a direct current (DC) power;

a first inductor unit interposed between the power supply unit and the first electrode;

a second inductor unit interposed between the power supply unit and the second electrode;

a first switching unit connected with a first node between the first inductor unit and the first electrode;

a second switching unit connected with a second node between the second inductor unit and the second electrode; and a controller which controls the first and second switching units to control conversion of the DC power into the first AC power by the first inductor unit and the light source, and conversion of the DC power into the second AC power by the second inductor unit and the light source, so that the first AC power and the second AC power are sequentially input to the light source according to a pulsewave.

22. The apparatus of claim 21, wherein the first AC power and the second AC power have a length of pause time according to the pulsewave and a phase reverse to each other.

23. The apparatus of claim 21, wherein if the first switching unit is turned off, the first inductor unit and the light source are resonated and convert the DC power into the first AC power.

24. The apparatus of claim 21, wherein if the second switching unit is turned off, the second inductor unit and the light source are resonated and convert the DC power into the second AC power.

25. The apparatus of claim 21, wherein the controller controls the first and second switching units so that the first electrode receives an electric potential higher than the second electrode in an alternating order, and that the first and second powers are converted sequentially.

26. The apparatus of claim 25, wherein the controller causes the electric potential of the first electrode to be formed according to the first AC power and the second AC power, and causes the electric potential of the second electrode to be formed according to a ground power.

27. The apparatus of claim 21, further comprising a booster circuit comprising a primary coil connected between the first and second nodes, and a secondary coil facing the primary coil and connected with both ends of the first and second electrodes.

28. The apparatus of claim 21, wherein the controller controls the first and the second switching units such that a pause of providing any AC power to the light source is generated such that a potential difference between the first electrode and the second electrode is 0V, the pause is provided for a constant predetermined duration between each pulse of the pulsewave generated by the first and the second AC power and the constant predetermined duration is set at least equal to a length of time which permits the light source to fully charge and fully discharge.

29. The apparatus of claim 21, wherein the first node directly connects the first electrode to a terminal of the first inductor unit and the second node directly connects the second electrode to a terminal of the second inductor unit, when the first switching unit is in an ON state, the first switching unit connects the first node to ground such that the second AC power is input to the light source, and when the second switching unit is in an ON state, the second switching unit connects the second node to the ground such that the first AC power is input to the light source.

30. The apparatus of claim 29, wherein another terminal of the first inductor unit and another terminal of the second inductor unit are both connected directly to the power supply unit.

31. An apparatus for driving a light source, the apparatus comprising:
- a first electrode;
- a second electrode;
- a dielectric material interposed between the first and second electrodes, wherein the light source is driven by a first alternating current (AC) power and a second AC power supplied to the first and second electrodes;
- a power supply unit which outputs a direct current (DC) power;
- an inductor unit interposed between the power supply unit and the first electrode;
- a first switching unit connected in parallel with the light source at a node between the inductor unit and the first electrode;
- a second switching unit connected in series with the light source at the node; and
- a controller which controls the first and second switching units to control sequential conversion of the DC power into the first AC power and the second AC power by the inductor unit and the light source, so that the first AC power and the second AC power are sequentially input to the light source according to a pulsewave.

32. The apparatus of claim 31, wherein the controller provides a switching signal for controlling switching operation of the first and second switching units so that the first AC power and the second AC power have a pulsewidth of a potential and a length of pause time according to the pulsewave.

33. The apparatus of claim 31, wherein the controller controls the first and the second switching units such that a pause of providing any AC power to the light source is generated such that a potential difference between the first electrode and the second electrode is 0V, the pause is provided for a constant predetermined duration between each pulse of the pulsewave generated by the first and the second AC power and the constant predetermined duration is set at least equal to a length of time which permits the light source to fully charge and fully discharge.

34. A method for driving a light source, the method comprising:
- converting a direct current (DC) power into an alternating current (AC) power for driving the light source, according to a pulsewave; and
- controlling to pause providing AC power to the light source, wherein the pause is provided for a constant predetermined duration between each pulse of a pulsewave generated by the AC power.

35. The method of claim 34, further comprising controlling at least one of a phase, a pulsewidth, and the duration of the pause of the AC power, so that the AC power is converted according to the pulsewave.

36. The method of claim 34, wherein the converting comprises sequentially converting the DC power into a first AC and a second AC power.

37. The method of claim 36, wherein the first AC power and the second AC power are sequentially input to the light source, and have a length of pause time according to the pulsewave and a phase reverse to each other.

38. The method of claim 34, further comprising boosting the first AC power and the second AC power and providing the first AC power and the second AC power which are boosted to the light source.

39. The method of claim 34, wherein the AC power has a length of pause time according to the pulsewidth.

40. A display apparatus comprising:
- a light source unit comprising a first electrode, a second electrode, and a dielectric material interposed between the first and second electrodes;
- a light source driving unit comprising a power converting unit which converts a direct current (DC) power into an alternating current (AC) power for driving the light source; and
- a display panel which displays an image light emitted from the light source; and
- a control unit which controls the power converting unit to convert the DC power into the AC power according to a pulsewave,
- wherein the control unit controls the power converting unit to pause providing AC power to the light source, and the pause is provided for a constant predetermined duration between each pulse of the AC power.

41. The display apparatus of claim 40, wherein the dielectric material is formed of a radiating gas, and the light source unit comprises a surface light source device which emits the light, using plasma radiation of the AC power which is input to the first and second electrodes.

42. The display apparatus of claim 40, wherein the control unit controls at least one of a phase, a pulsewidth, and the duration of the pause of the AC power, so that the AC power is converted according to the pulsewave.

* * * * *